US009281907B2

(12) United States Patent
An et al.

(10) Patent No.: US 9,281,907 B2
(45) Date of Patent: Mar. 8, 2016

(54) QUADRATURE ERROR CORRECTION USING POLYNOMIAL MODELS IN TONE CALIBRATION

(71) Applicant: Analog Devices, Inc., Norwood, MA (US)

(72) Inventors: Wei An, Newton, MA (US); Richard P. Schubert, Medfield, MA (US); Yosef Stein, Sharon, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 359 days.

(21) Appl. No.: 13/897,719

(22) Filed: May 20, 2013

(65) Prior Publication Data
US 2014/0273902 A1 Sep. 18, 2014

Related U.S. Application Data

(60) Provisional application No. 61/798,197, filed on Mar. 15, 2013.

(51) Int. Cl.
H04B 1/16 (2006.01)
H04B 17/21 (2015.01)
H04B 17/391 (2015.01)

(52) U.S. Cl.
CPC .......... H04B 17/21 (2015.01); *H04B 17/391* (2015.01)

(58) Field of Classification Search
None
See application file for complete search history.

(56) References Cited

U.S. PATENT DOCUMENTS

| 5,705,949 A | 1/1998 | Alelyunas et al. |
| 5,852,630 A | 12/1998 | Langberg et al. |
| 6,628,735 B1 | 9/2003 | Belotserkovsky et al. |
| 6,748,029 B1 | 6/2004 | Lee |
| 7,310,388 B2 | 12/2007 | Koskela et al. |
| 7,830,954 B2 | 11/2010 | Welz et al. |
| 7,894,555 B2 | 2/2011 | Lindoff et al. |
| 8,036,317 B2 | 10/2011 | D'Alessandro |
| 8,290,450 B2 | 10/2012 | Hammerschmidt et al. |
| 8,331,506 B2 | 12/2012 | Park et al. |
| 8,379,767 B2 | 2/2013 | Zhu |
| 8,442,171 B2 | 5/2013 | Razzell |
| 8,498,591 B1 * | 7/2013 | Qian et al. ............... 455/114.3 |
| 8,509,298 B2 | 8/2013 | Hormis |
| 2001/0022532 A1 | 9/2001 | Dolman |
| 2004/0063416 A1 | 4/2004 | Kuenen et al. |

(Continued)

FOREIGN PATENT DOCUMENTS

| EP | 2367332 | 9/2011 |
| RU | 2011123470 | 1/2013 |

(Continued)

OTHER PUBLICATIONS

U.S. Appl. No. 13/764,076, filed Feb. 11, 2013.
Non-Final Office Action for U.S. Appl. No. 13/764,076 mailed Feb. 20, 2014, 34 pages.
Final Office Action for U.S. Appl. No. 13/764,076 mailed Jun. 3, 2014, 33 pages.

(Continued)

*Primary Examiner* — Lana N Le
(74) *Attorney, Agent, or Firm* — Patent Capital Group

(57) ABSTRACT

One example embodiment provides a system, apparatus, and method for using polynomial models in tone calibration for quadrature error correction in I/Q receivers. In one example embodiment, method for calibrating an I/Q receiver is provided and includes receiving a first mismatch parameter indicating a mismatch between I and Q channels of the I/Q receiver; and estimating a second mismatch parameter from the first mismatch parameter using a polynomial model.

20 Claims, 5 Drawing Sheets

(56) References Cited

U.S. PATENT DOCUMENTS

| | | | |
|---|---|---|---|
| 2004/0203472 A1* | 10/2004 | Chien | 455/68 |
| 2005/0201487 A1 | 9/2005 | Gaschler | |
| 2007/0058755 A1 | 3/2007 | Husted | |
| 2007/0153884 A1* | 7/2007 | Balasubramanian et al. | 375/221 |
| 2008/0219338 A1 | 9/2008 | Chrabieh | |
| 2010/0008449 A1* | 1/2010 | Sayers | 375/322 |
| 2010/0105338 A1* | 4/2010 | Wang et al. | 455/73 |
| 2010/0128808 A1 | 5/2010 | Ro et al. | |
| 2010/0166049 A1* | 7/2010 | Ahirwar et al. | 375/221 |
| 2012/0087451 A1 | 4/2012 | Razzell | |
| 2012/0163430 A1 | 6/2012 | Agawa | |
| 2012/0263217 A1 | 10/2012 | Gossmann | |
| 2012/0314784 A1 | 12/2012 | Pratt et al. | |
| 2013/0243131 A1 | 9/2013 | An et al. | |
| 2014/0036983 A1 | 2/2014 | Ito | |
| 2014/0270001 A1 | 9/2014 | Schubert et al. | |
| 2014/0270002 A1 | 9/2014 | Schubert et al. | |

FOREIGN PATENT DOCUMENTS

| | | |
|---|---|---|
| WO | 2005/029798 | 3/2005 |
| WO | 2014/145350 | 9/2014 |

OTHER PUBLICATIONS

Non-Final Office Action for U.S. Appl. No. 13/764,076 mailed Sep. 17, 2014, 17 pages.
Final Office Action for U.S. Appl. No. 13/764,076 mailed Feb. 6, 2015, 24 pages.
Valkama et al., "Compensation of Frequency-Selective I/Q Imbalances in Wideband Receivers: Models and Algorithms," IEEE Third Workshop on Signal Processing Advances in Wireless Communications, 2001, (SPAWC '01), pp. 42-45.
International Search Report and Written Opinion dated May 21, 2013, issued in corresponding International Application No. PCT/US2013/030337, 11 pages. (WO2013/138267), 9 pages.
U.S. Appl. No. 14/214,539, filed Mar. 14, 2014.
Non-Final Office Action issued in U.S. Appl. No. 14/214,539 mailed Sep. 1, 2015, 15 pages.
U.S. Appl. No. 14/214,660, filed Mar. 14, 2014.
PCT Application Serial No. PCT/US2014/030091 filed Mar. 14, 2014.
International Search Report and Written Opinion in PCT Application Serial No. PCT/US2014/030091 mailed Jul. 10, 2014, 6 pages.
Non-Final Office Action issued in U.S. Appl. No. 14/214,660 mailed Sep. 9, 2015, 16 pages.

* cited by examiner

QUADRATURE ERROR CORRECTION USING POLYNOMIAL MODELS IN TONE CALIBRATION

PRIORITY DATA

This application claims the priority of Provisional Patent Application Ser. No. 61/798,197, filed Mar. 15, 2013, which is hereby incorporated by reference in its entirety.

TECHNICAL FIELD OF THE DISCLOSURE

This present disclosure relates generally to in-phase and quadrature (I/Q) receiver signal processing and, more particularly, to an apparatus, method and system for calibrating gain and phase imbalance in I/Q receivers.

BACKGROUND

Quadrature modulation is a technique for transmitting a communication signal. In quadrature modulation, a transmitter simultaneously transmits data on an in-phase (I) channel and a quadrature-phase (Q) channel. Each of the I and Q channels carry a separate data stream and are phased-shifted by 90 degrees relative to one another on a carrier frequency. In an I/Q receiver, the I and Q channel signals are received on the carrier frequency, down-converted and demodulated to recover the data from the separate I and Q channels.

The I/Q receiver includes separate analog processing paths for each of the I and Q channels. Each of the I and Q channel paths includes processing components that process the received analog signal and convert it to digital form, such as, for example, mixers, analog to digital converters (ADCs), amplifiers, and filters. These separate components down-convert and process the channel signal data for each of the paths. The use of the separate I and Q analog processing paths in the I/Q receiver results in what is known as I/Q imbalance, which is the phase and amplitude mismatch between the I and Q channel signals. The major source of I/Q imbalance in I/Q receivers is mismatch between the separate components in each of the I and Q channel processing paths.

There are two types of I/Q imbalance: frequency-independent mismatch and frequency-dependent mismatch. Frequency-independent mismatch is phase mismatch caused the local oscillator (LO) in the mixer of each I/Q analog path. These mismatches are similar across the frequency spectrum and, further, can be successfully estimated for error correction. Frequency-dependent mismatch is the phase and amplitude mismatch caused by the baseband components in each of the I and Q channel analog paths. The frequency-dependent mismatch complicates the mismatch estimation technique because the mismatches are not uniform across the frequency spectrum.

Techniques have been developed to estimate the mismatch parameters for the analog paths of an I/Q receiver. These techniques include real-time estimation, in which the receiver estimates mismatch parameters and compensates for the mismatch during real-time use of the receiver. The techniques also include off-line estimation, in which the receiver is not in use when estimation of mismatch is performed and correction parameters are input to the receiver. Off-line estimation methods may use tone injection techniques to inject test tones into the receiver at the inputs to the I and Q channels to calibrate mismatch between the channels using a method of tone calibration. The techniques have been shown to be most effective in the low-noise environment and, further, when the jitter of the test tone signals is lower than a certain level. In high-noise level environments or when test tone signal jitter increases above a certain level, the effectiveness of these known techniques decreases. It would provide an advantage, therefore, to have a method for estimating I/Q channel mismatch that had improved effectiveness in noisy environments and/or at high jitter levels in the test tone signals.

OVERVIEW OF EXAMPLE IMPLEMENTATIONS

The present disclosure provides an apparatus, method, and system for calibrating I/Q imbalance in I/Q receivers. In an embodiment according to the disclosure, a polynomial model is applied to results of tone calibration to generate mismatch parameters for calibrating an I/Q receiver. One example embodiment provides a system, apparatus, and method for using polynomial models in tone calibration for quadrature error correction in I/Q receivers. In one example embodiment, method for calibrating an I/Q receiver is provided and includes receiving a first mismatch parameter indicating a mismatch between I and Q channels of the I/Q receiver; and estimating a second mismatch parameter from the first mismatch parameter using a polynomial model.

Initially, tone calibration is used for generating a total mismatch estimation for the I and Q channels of the I/Q receiver. The results from the tone calibration can then be processed in the polynomial calibration method of the embodiment to generate frequency-dependent and frequency-independent mismatch parameter estimations. The estimated values of the frequency-dependent and frequency independent mismatch parameters generated by the polynomial calibration method may be then used to process the signals in a quadrature error correction (QEC) unit to compensate for the mismatch. One embodiment of the disclosure results in values of gain and phase mismatch that provide an improved and more accurate calibration process by using the polynomial method. Because there is a significant reduction of unknown parameters used for the polynomial calibration estimation as compared to known techniques, the method shows a strong robustness to noise.

According to another embodiment of the disclosure, a polynomial model is applied to results of tone calibration to generate mismatch parameters for calibrating an I/Q receiver. Initially, tone calibration is used for estimating total gain and total phase mismatch between the I and Q channels of the I/Q receiver. The results from the tone calibration are then processed in the polynomial calibration method to generate frequency-dependent gain and phase mismatch, and frequency independent phase mismatch estimations. The estimated values of the mismatch parameters generated by the polynomial calibration method may be then used to process the signals in a quadrature error correction (QEC) unit to compensate for the mismatch.

According to another embodiment of the disclosure, a polynomial model is applied to tone calibration total gain and total phase estimation results to estimate frequency-dependent gain and phase mismatch, and frequency-independent phase mismatch for I and Q channels in a RF receiver. The polynomial model is applied jointly over all frequency pairs across the spectrum when estimating the mismatch rather than evaluating mismatches for frequency pairs by assuming that mismatch is the same at symmetric positive and negative frequencies. In one example embodiment, positive and negative frequencies are treated as having separate mismatches. The estimated values of frequency-dependent gain and phase mismatch, and frequency-independent phase mismatch may be then used to process the signals in an error correction unit to compensate for the mismatch.

According to another embodiment of the disclosure a polynomial model is applied to tone calibration to estimate frequency-dependent and frequency-independent mismatch between and Q channels in a RF receiver. The polynomial model is applied to tone calibration total gain and total phase mismatch estimation results using least squared error (LSE) optimization to estimate frequency-dependent gain and phase mismatch, and frequency-independent phase mismatch more accurately. The polynomial model is applied jointly over all frequency pairs across the spectrum, rather than evaluating mismatch individually for each frequency pair by assuming that symmetric positive and negative frequencies have the same mismatch.

According to a further embodiment, the disclosure provides a calibration system that includes a polynomial calibration (PCAL) estimator, a tone calibration (TCAL) estimator, a tone generator, and a transform processor. In one example embodiment, the calibration system is used for offline testing of an I/Q receiver. The TCAL estimator controls the tone generator to input test tones at frequency values within a test spectrum into the analog paths of an I/Q receiver. The I/Q receiver comprises a mixer section with a local oscillator (LO) and mixers, and I and Q paths with analog to digital converters (ADCs). The tones are sent through the receiver analog paths. After passing through the receiver paths, the resultant time domain signals are transformed from the time domain to the frequency domain by the transform processor.

The TCAL estimator then operates on the frequency domain signals to generate a total gain mismatch, $g(f_T)$, estimate and a total phase mismatch, $\phi(f_T)$, estimate for mismatch between the I and Q channels. The results from the TCAL tone calibration estimator are then processed by the PCAL estimator. The PCAL estimator estimates the frequency dependent gain mismatch, g(n), modeling the magnitude mismatch profile using the polynomial method and the least squared (LSE) method. The polynomial coefficients are estimated and the estimated polynomial coefficients are used to compute the magnitude for each frequency band, g(n), using the polynomial. The PAL estimator then estimates the frequency independent phase mismatch, $\phi_{LO}$, and frequency dependent phase mismatch, $\phi_m(n)$, using the polynomial method. The frequency dependent gain and phase mismatch parameters, and frequency independent phase mismatch parameters are then input to a quadrature error correction (QEC) processor and the QEC processor may compensate and correct for the mismatch in the I/Q receiver.

DETAILED DESCRIPTION OF EXAMPLES OF THE DISCLOSURE

Figure 1:
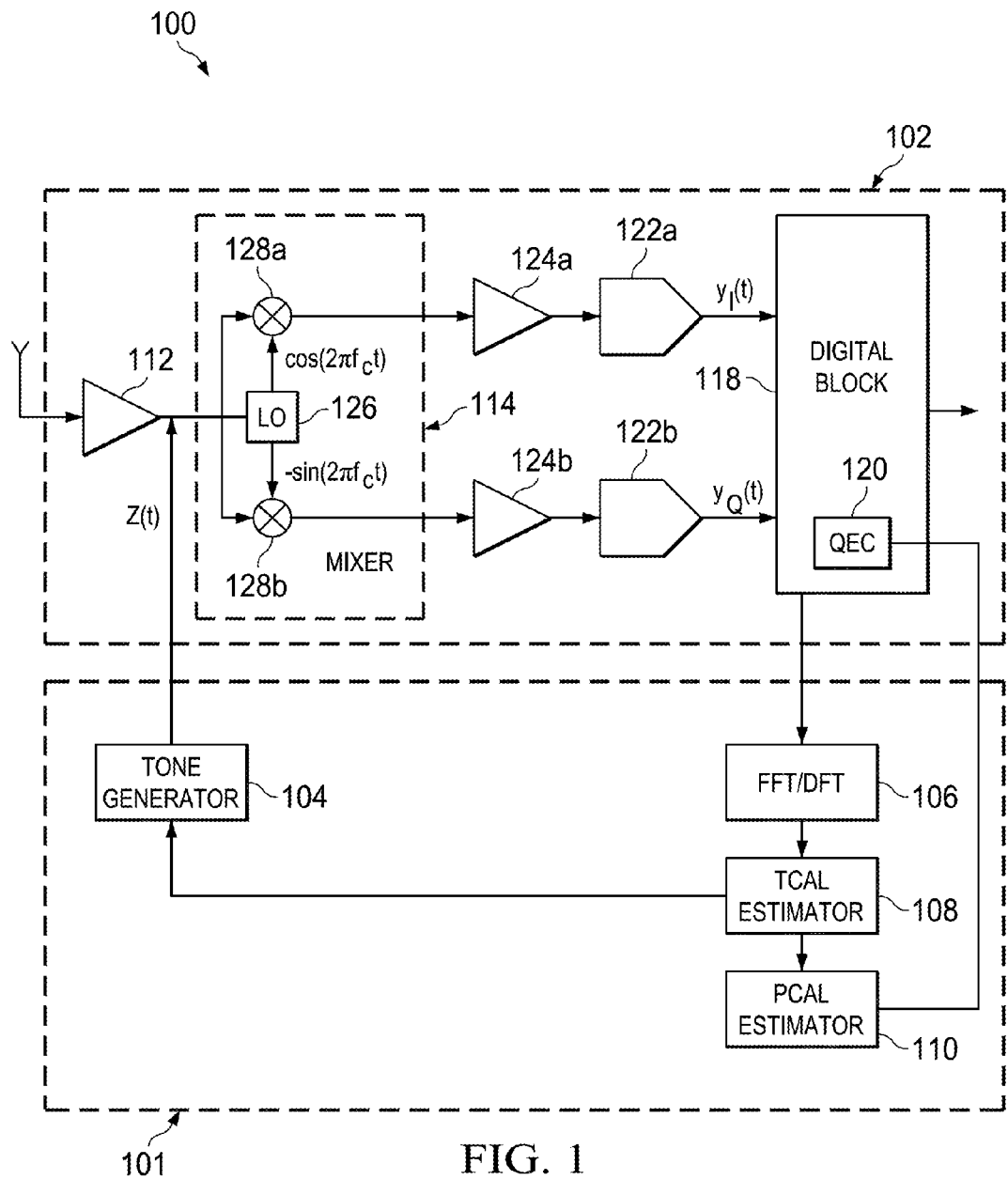
FIG. 1 illustrates an example simplified functional block diagram of a test system according to an example of the disclosure.

Referring now to FIG. 1, therein is illustrated a simplified functional block diagram of a test system 100 according to one example embodiment of the disclosure. Test system 100 includes test apparatus 101 and receiver 102. Test apparatus 101 comprises tone generator 104, transform processor 106, tone calibration (TCAL) estimator 108, and polynomial calibration (PCAL) estimator 110. In FIG. 1, receiver 102 represents a receiver under calibration using test apparatus 101. Receiver 102 comprises low noise amplifier (LNA) 112, mixer 114, digital processor block 118, and quadrature error correction (QEC) processor block 120. Mixer 114 includes local oscillator (LO) 126 and multipliers 128a and 128b. The analog paths of receiver 102 include separate I channel and Q channel processing paths for received in-phase (I) and quadrature-phase (Q) signals. The analog paths include the I channel analog path though multiplier 128a, transimpedance amplifier (TIA) 124a and analog to digital converter (ADC) 122a, and the Q channel analog path through multiplier 128b, transimpedance amplifier (TIA) 124b and ADC 122b. In one example embodiment of FIG. 1, test apparatus 101 is used to calibrate receiver 102 in an offline mode, i.e., receiver 102 is taken offline and is not operational during calibration. Test apparatus 101 may be implemented in various combinations of hardware and software. For example, digital signal processors (DSPs), application specific integrated circuits (ASICs), or other circuitry controlled by appropriate software may be used to implement the functions of the embodiment.

In one example embodiment of FIG. 1, PCAL estimator 110 provides an estimation of the mismatches between the I and Q paths of receiver 102 for use in QEC processor 120. PCAL estimator 110 receives estimations of total gain mismatch and total phase mismatch between the I and the Q channels from TCAL estimator 108. PCAL estimator 110 applies a polynomial model and least squared error (LSE) optimization to the total gain and total frequency mismatch to generate mismatch parameter estimates for frequency dependent gain mismatch, frequency dependent phase mismatch, and frequency independent phase mismatch. The mismatch parameters estimated in PCAL estimator 110 may then be used in QEC processor block 120 to calibrate receiver 102 to compensate for gain and frequency mismatch.

Figure 2:
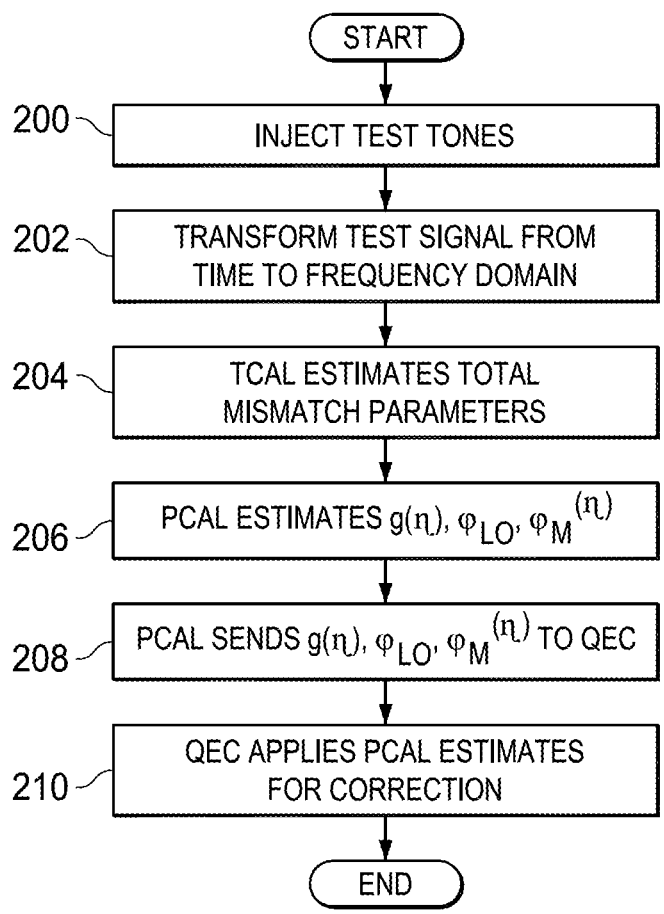
FIG. 2 illustrates example process operations in accordance with an embodiment of the disclosure.

Referring now to FIG. 2, therein are illustrated process operations according to an example embodiment of the disclosure. These operations are performed within the hardware and software that implements the functional blocks shown in the example embodiment of FIG. 1. The test process begins at process operation 200, as RF test tones are input into mixer 114 by tone generator 104. The test tones are each at a frequency from a set of frequencies ranging over a desired test spectrum. In mixer 114, the test tones are multiplied with the in-phase wave $\cos(2\pi f_c t)$ and the quadrature wave $-\sin(2\pi f_c t)$ at multipliers 128a and 128b, respectively. The test tones may modeled as the signal z(t):

$$z(t) = 2A \cdot \cos(2\pi f_c t + 2\pi f_T t + \theta)$$
$$= 2A \cdot (\cos(2\pi f_c t)\cos(2\pi f_T t + \theta) - \sin(2\pi f_c t)\sin(2\pi f_T t + \theta)),$$

where, 2A is the amplitude of the tone (the factor of 2 in the amplitude is added here for convenience in calculations), $f_c$ is the carrier frequency, $f_T$ is the tone frequency and $\theta$ is the relative phase of the tone with respect to LO 126 in mixer 114.

The results are passed into each of the I and Q channels of the analog paths, through low pass filters, 124a and 124b, respectively. The quadrature wave has both magnitude and phase deviations, denoted as $g_{LO}$ an $\phi_{LO}$ respectively. Then the quadrature wave becomes $-g_{LO}\sin(2\pi f_c t + \phi_{LO})$. For the I channel, the signal is processed as:

$$\begin{aligned}x_I(t) &= LPF(x(t) \cdot \cos(2\pi f_c t)) \\ &= LPF(2A \cdot \cos(2\pi f_c t + 2\pi f_T t + \theta)\cos(2\pi f_c t)) \\ &= LPF\left(2A \cdot \frac{1}{2}(\cos(4\pi f_c t + 2\pi f_T t + \theta) + \cos(2\pi f_T t + t\theta))\right) \\ &= A \cdot \cos(2\pi f_T \theta)\end{aligned}$$

Similarly in the Q channel, the signal is:

$$\begin{aligned}x_Q(t) &= LPF(-z(t) \cdot g_{LO}\sin(2\pi f_c t + \varphi_{LO})) \\ &= LPF(-2A \cdot \cos(2\pi f_c t + 2\pi f_T t + \theta)g_{LO}\sin \\ &\quad (2\pi f_c t + \varphi_{LO})) \\ &= LPF\left(-2g_{LO}A \cdot \frac{1}{2}(\sin(4\pi f_c t + 2\pi f_T t + \theta + \varphi_{LO}) - \right.\\ &\quad \sin(2\pi f_T t + \theta - \varphi_{LO}))) \\ &= g_{LO}A \cdot \sin(2\pi f_T t + \theta - \varphi_{LO})\end{aligned}$$

The effect of the nominal baseband channel on a tone with frequency $f_T$ is composed of the magnitude $g_n(f_T)$ mismatch and the phase shift $\phi_n(f_T)$ mismatch. These mismatches are both dependent on the tone frequency. The processing assumes the I signal goes through the nominal baseband channel, then:

$$y_I(t) = x_I(t) = g_n(f_T)A \cdot \cos(2\pi f_T t + \theta + \phi_n(f_T))$$

Again, the processing assumes the baseband mismatch only applies to the Q path. The channel gain and phase shift in Q path is $g_n(f_T)g_m(f_T)$ and $\phi_n(f_T)+\phi_m(f_T)$, where $g_m(f_T)$ and $\phi_m(f)$ are mismatched baseband gain and phase. Then the Q path signal becomes:

$$y_Q(t) = g_{LO}g_n(f_T)g_m(f_T)A \cdot \sin(2\pi f_T t + \theta + \phi_{LO} + \phi_n(f_T) + \phi_m(f_T))$$

$$= g_n(f_T)A \cdot g_{LO}g_m(f_T) \cdot \sin(2\pi f_T t + \theta + \phi_n(f_T) - \phi_{LO} + \phi_m(f_T))$$

The signals $y_I(t)$ and $y_Q(t)$ have magnitude and phase mismatches between I and Q paths defined as:

$$g(f_T) = g_{LO}g_m(f_T)\phi(f_T) = -\phi_{LO} + \phi_m(f_T)$$

Utilizing the common factors:

$$A(f_T) = g_n(f_T)A \text{ and } \theta(f_T) = \theta + \phi_n(f_T),$$

The baseband I/Q signals $y_I(t)$ and $y_Q(t)$ at end of the analog paths and at the input to digital block 118 are given by, $$y_I(t) = A(f_T)\cdot\cos(2\pi f_T t + \theta(f_T))$$

$$y_Q(t) = g(f_T)A(f_T)\cdot\sin(2\pi f_T t + \theta(f_T) + \phi(f_T))$$

The baseband signals are then processed by test apparatus 101 to estimate the mismatch parameters of the I channel and the Q channel.

At process operation 202, transform processor 106 applies a transform to each of the baseband I and Q signals separately to transform each of the baseband signals from the time to the frequency domain. In one example embodiment of FIG. 1, transform processor 106 may be capable of performing either of the fast Fourier transform (FFT) or discrete Fourier transform (DFT) as a test alternative. In alternative embodiments, transform processor 106 could use one or both of the FFT or DFT or another transform. Both of the FFT or DFT may generate a transform result that may be input to TCAL estimator 108. FFT and DFT methods can avoid interference from co-existing harmonic tones. The difference between the two is that FFT computes frequency points across the whole spectrum, whereas DFT can compute selected points around the tone frequency. The latter can be much less computational complex especially when the signal length increases. Both methods can follow the same mathematical formula that will be shown here for the example embodiment of FIG. 1.

Transform processor 106 uses the DFT (or FFT) to compute a frequency point by correlating the signal with a complex harmonic wave at that frequency. Application of the transform to the I signal, gives:

$$\begin{aligned}Y_I(f) &= \int y_I(t) \cdot e^{-j2\pi ft}dt \\ &= \int A(f_T) \cdot \cos(2\pi f_T t + \theta(f_T))e^{-j2\pi ft}dt \\ &= \frac{A(f_T)}{2} \cdot \int (e^{j2\pi f_T t + j\theta(f_T)} + e^{-j2\pi f_T t - j\theta(f_T)}) \\ &\quad e^{-j2\pi ft}dt \\ &= \begin{cases}\frac{A(f_T)}{2} \cdot e^{j\theta(f_T)}, & f = f_T \\ \frac{A(f_T)}{2} \cdot e^{-j\theta(f_T)}, & f = -f_T\end{cases}\end{aligned}$$

Similarly applying the transform to the Q signal, gives:

$$\begin{aligned}Y_Q(f) &= \int y_Q(t) \cdot e^{-j2\pi ft}dt \\ &= \int g(f_T)A(f_T) \cdot \sin(2\pi f_T t + \theta(f_T) + \\ &\quad \varphi(f_T))e^{-j2\pi ft}dt \\ &= \frac{g(f_T)A(f_T)}{2j} \cdot \int (e^{j(2\pi f_T t + \theta(f_T) + \varphi(f_T))} - \\ &\quad e^{-j(2\pi f_T t + \theta(f_T) + \varphi(f_T))})e^{-j2\pi ft}dt \\ &= \begin{cases}\frac{g(f_T)A(f_T)}{2j} \cdot e^{j(\theta(f_T) + \varphi(f_T))}, & f = f_T \\ -\frac{g(f_T)A(f_T)}{2j} \cdot e^{-j(\theta(f_T) + \varphi(f_T))}, & f = -f_T\end{cases}\end{aligned}$$

Transform processor 106 then outputs the transformed signals $Y_Q(f_T)$ and $Y_I(f_T)$ to TCL estimator 108. At process operation 204, TCAL estimator 108 then estimates the total gain and total frequency mismatch parameters using the frequency domain transformed signals. TCAL estimator 108 divides $Y_Q(f_T)$ with $Y_I(f_T)$ giving:

$$\frac{Y_Q(f_T)}{Y_I(f_T)} = $$

$$-jg(f_T)\cdot e^{j\varphi(f_T)} = -jg(f_T)\cdot e^{j\varphi_m(f_T)} \cdot e^{-j\varphi_{LO}} = -jH_D(f_T)\cdot g_{LO}e^{-j\varphi_{LO}},$$

where $H_D(f_T)$ is the baseband mismatch and $g_{LO}e^{-j\phi_{LO}}$ is the LO mismatch and the total gain mismatch is given by:

$$g(f_T) = \left|\frac{Y_Q(f_T)}{Y_I(f_T)}\right|,$$

and the total phase mismatch is given by:

$$\varphi(f_T) = \text{angle}\left(\frac{Y_Q(f_T)}{Y_I(f_T)}\right) - \frac{\pi}{2}$$

The estimated total phase mismatch is the combined phase mismatch of LO 126 and the baseband analog path and is given by, $\phi(f) = -\phi_{LO} + \phi_m(f)$. The two components are separated out from the total phase mismatch to perform quadrature error correction in the I/Q receiver 102. At this point, TCAL estimator 108 has information to calculate a estimation of the frequency dependent gain and phase mismatch, and frequency independent phase mismatch. One optional method of performing the calculation would be to assume that $g(f_T)$ is symmetric between positive and negative frequencies and that the phase mismatch is odd symmetric to the zero frequency, i.e. $\phi_m(-f) = -\phi_m(f)$. This assumption may be used because the impulse response of baseband mismatch is real valued. Then the LO phase mismatch could be computed over the bandwidth of the device that the test tones sweep through. In addition, the frequency dependent baseband phase mismatch could also then be estimated as the difference between the total phase mismatch and the LO phase mismatch. However, using this assumption does not allow a completely accurate estimation of the mismatch of a receiver, especially in a high-noise environment or when there is a high jitter level in the test tones.

In one example embodiment, test apparatus 101 (including PCAL estimator 110) provides an improved estimation of $g(f)$, $\phi_{LO}$ and $\phi_m(f)$ by using a polynomial method to calculate mismatch estimates from total gain and phase mismatch jointly over all frequency pairs. The frequency-dependent I/Q imbalance is mainly caused by small differences in the poles and zeros of the transfer functions of the I channel and Q channel paths. Therefore, the frequency domain mismatch manifests itself as relatively smooth curve across the frequency spectrum. This property makes it possible to model the mismatch curve with a polynomial function. In the polynomial method a critical factor in the mismatch parameter estimation is the estimation of the polynomial coefficients.

Referring again to FIG. 2, PCAL estimator 110 receives the total gain and frequency mismatch parameter estimates from TCAL estimator 108 at process operation 206. PCAL estimator 110 then estimates the frequency dependent gain and phase mismatch parameters and frequency independent phase mismatch parameters, jointly over the frequency pairs, including positive and negative frequencies, of the test spectrum.

Figure 3A:
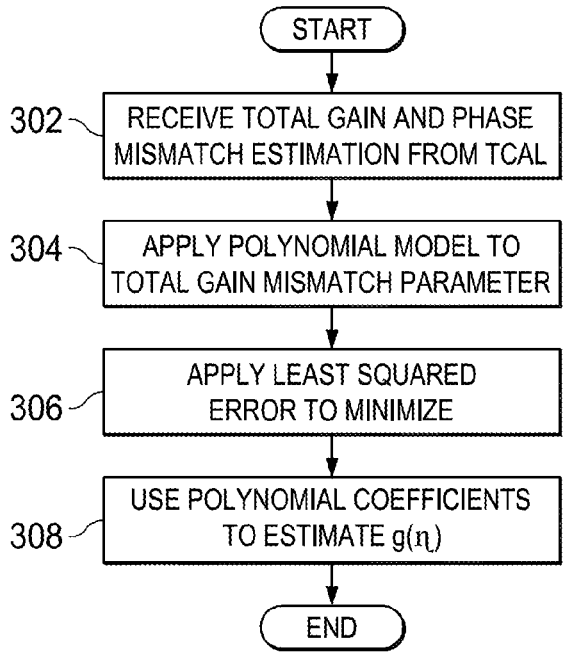
FIG. 3A illustrates example process operations in accordance with an embodiment of the disclosure.

Referring to FIG. 3A, therein are shown process operations performed by PCAL estimator 110 during the process of operation 206 of FIG. 2. At process operation 302, PCAL estimator 110 receives the total gain and total phase mismatch estimation from TCAL estimator 108. In one example embodiment of test apparatus 101, N tones are generated over the test spectrum. PCAL estimator 110 evaluates the total mismatch parameters for each of these N tones giving the following values for total gain Q(n), mismatch and total phase W(n) mismatch:

$$Q(n) = \left|\frac{Y_Q(f_n)}{Y_I(f_n)}\right|, n = 0, 1, \ldots, N-1$$

and, $$W(n) = \text{angle}\left(\frac{Y_Q(f_n)}{Y_I(f_n)}\right) - \frac{\pi}{2}$$

At step 304, PCAL estimator 110 applies the polynomial model to the gain parameter. In one example embodiment, a $4^{th}$ order polynomial may be used to model the frequency-dependent gain mismatch profile g(n). In alternative embodiments, the order of the polynomial used may be of any order, for example $3^{rd}$, and chosen based on simulations or any other suitable method appropriate for choosing. The polynomial model used for g(n) is:

$$g(n) = P_0 + P_1 n + P_2 n^2 + P_3 n^3 + P_4 n^4$$

There are N frequency bins that provide N linear equations to estimate 5 unknown variables. For positive frequencies, the equations are:

$$P_0 + P_1 n + P_2 n^2 + P_3 n^3 + P_4 n^4 = Q(n), n = 0, \ldots, \frac{N}{2} - 1$$

For negative frequencies, the indices are modified from the transform, for example:

$$P_0 + P_1(n-N) + P_2(n-N)^2 + P_3(n-N)^3 + P_4(n-N)^4 = Q(n),$$

$$n = \frac{N}{2}, \ldots, N-1$$

In matrix format, the linear system becomes:

$$K \cdot P = Q$$

where, $$K = \begin{bmatrix} 1 & 0 & 0 & 0 & 0 \\ 1 & 1 & 1 & 1 & 1 \\ \vdots & \vdots & \vdots & \vdots & \vdots \\ 1 & n & n^2 & n^3 & n^4 \\ \vdots & \vdots & \vdots & \vdots & \vdots \\ 1 & n-N & (n-N)^2 & (n-N)^3 & (n-N)^4 \\ 1 & -1 & 1 & -1 & 1 \end{bmatrix}$$

$$P = [P_0 \quad P_1 \quad P_2 \quad P_3 \quad P_4]^T$$

$$Q = [Q(0) \quad \ldots \quad Q(N-1)]^T$$

At step 306 PCAL estimator 110 then applies the least squared error method and minimizes the matrix:

$$J = (K \cdot P - Q)^T \cdot (K \cdot P - Q)$$

$$= P^T K^T K P - P^T K^T Q - Q^T K P + Q^T Q$$

PCAL estimator 110 calculates the derivative and equates it to zero yielding:

$$P = (K^T K)^{-1} K^T Q$$

At process operation 308, PCAL estimator 110 then computes frequency-dependent gain mismatch g(n). PCAL estimator 110 uses the estimated polynomial coefficients and calculates the magnitude for frequency-dependent gain mismatch g(n) at each frequency band using the polynomial model.

Figure 3B:
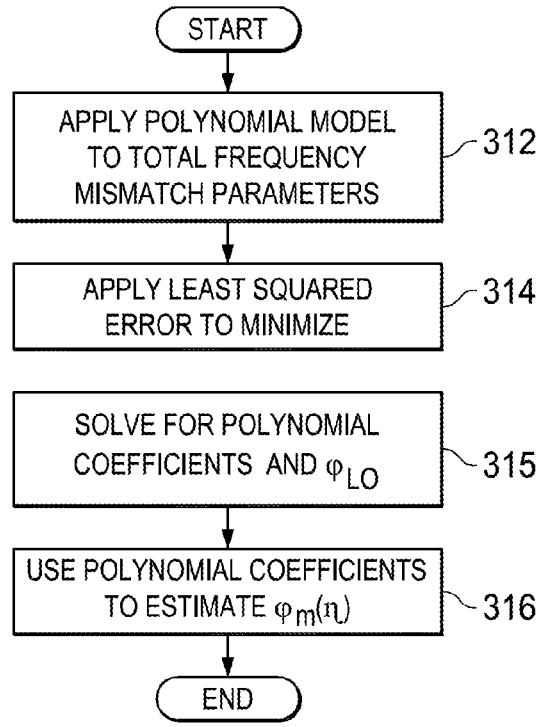
FIG. 3B illustrates example process operations in accordance with an embodiment of the disclosure.

Referring now to FIG. 3B, therein are illustrated process operations performed by PCAL estimator 110 in estimating frequency dependent and frequency independent phase mismatch according to an embodiment of the disclosure. FIG. 3B shows operations for the estimation of frequency dependent phase mismatch $\phi_m(n)$ and frequency independent phase mismatch $\phi_{LO}$. In process operation 312 of FIG. 3B, PCAL estimator 110 operates on the total phase mismatch parameter W(n) received at step 302 from TCAL estimator 108.

At process operation 312, PCAL estimator 110 uses the relation that $W(n)=-\phi_{LO}+\phi_m(n)$ and models the baseband phase $\phi_m(n)$ as a polynomial. PCAL estimator 110 also uses the relation $\phi_m(0)=0$. A $4^{th}$ order polynomial may be used in the embodiment of FIG. 1. The choice of polynomial may be made based on simulations or other methods of choice that determine the adequacy of a particular polynomial for use. PCAL estimator 110 models $\phi_m(n)$ as:

$$\phi_m(n)=C_1 n+C_2 n^2+C_3 n^3+C_4 n^4$$

This gives the linear equation array as:

$$-\varphi_{LO}+C_1 n+C_2 n^2+C_3 n^3+C_4 n^4 = W(n), n=1,\ldots,\frac{N}{2}-1$$

PCAL estimator 110 uses the 5 unknowns and $$\frac{N}{2}-2$$

equations to solve for the coefficients and frequency-independent phase mismatch $\phi_{LO}$. At process operation 314, PCAL estimator 110 applies the least squared error method for linear regression. The equations used can be expressed in matrix format as:

$$H \cdot C = W$$

where, $$H = \begin{bmatrix} -1 & 1 & 1 & 1 & 1 \\ \vdots & \vdots & \vdots & \vdots & \vdots \\ -1 & n & n^2 & n^3 & n^4 \\ \vdots & \vdots & \vdots & \vdots & \vdots \\ -1 & N/2-1 & (N/2-1)^2 & (N/2-1)^3 & (N/2-1)^4 \end{bmatrix}$$

$$C = [\varphi_{LO} \quad C_1 \quad C_2 \quad C_3 \quad C_4]^T$$

$$W = [W(1) \quad \ldots \quad W(N/2-1)]^T$$

The least squared error method minimizes J:

$$J = (H \cdot C - W)^T \cdot (H \cdot C - W)$$
$$= C^T H^T H C - C^T H^T W - W^T H C + W^T W$$

Then derivative may be taken and equated to zero yielding:

$$C=(H^T H)^{-1} H^T W$$

At process operation 315, PCAL estimator calculates the values of the polynomial coefficients including the value of $\phi_{LO}$. PCAL estimator 110 now has the value of the frequency independent phase mismatch parameter $\phi_{LO}$.

At process operation 316, PCAL estimator 110 then uses the polynomial coefficients to estimate the value of frequency dependent phase mismatch, $\phi_m(n)$, which may be estimated from the polynomial model with the available coefficient vector C. PCAL estimator now has values for the frequency dependent gain mismatch parameter, g(n), the frequency dependent phase mismatch parameter, $\phi_m(n)$, and, the frequency independent phase mismatch parameter, $\phi_{LO}$.

Referring again to FIG. 2, at process operation 208, PCAL estimator 110 then outputs the estimated frequency dependent gain and phase mismatch parameters and frequency independent phase mismatch parameter values to quadrature error correction block 120. The QEC functional block may then than apply the PCAL estimations for error compensation and correction in receiver 102.

Figure 4A:
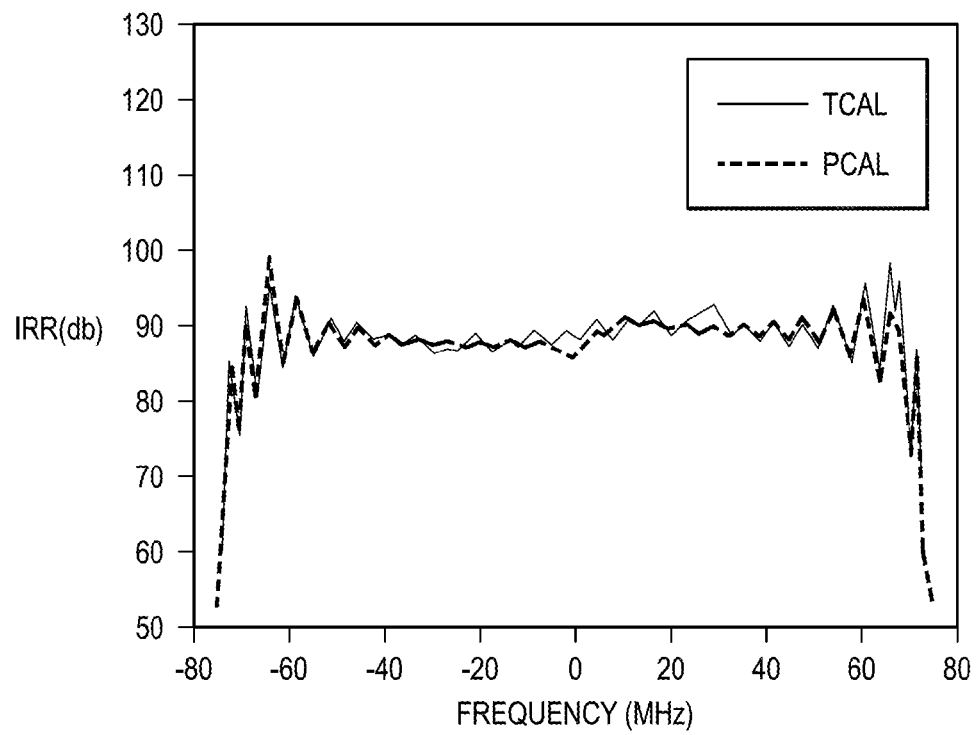
FIG. 4A illustrates an example graphical plot of the performance of an embodiment of the disclosure at a first noise level.
Figure 4B:
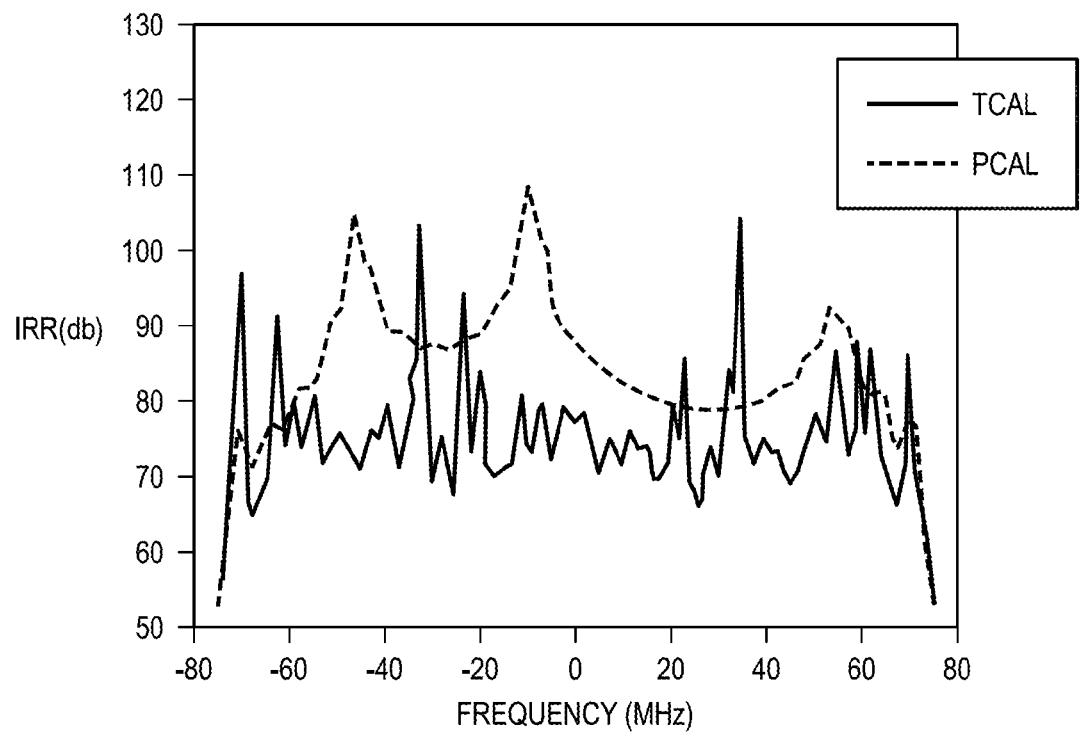
FIG. 4B illustrates an example graphical plot of the performance of an embodiment of the disclosure at a second noise level.

Referring now to FIGS. 4A-4B, therein are illustrated computer simulated image rejection ratio (IRR) plots that show an improvement that may provided by the PCAL estimator according to the example embodiment of FIG. 1. In FIGS. 4A-4D, PCAL calibration using the polynomial method is compared to the results that TCAL calibration gain and phase mismatch parameter estimation would give without using the polynomial estimation method (i.e., by making the assumption that gain mismatch is symmetric between positive and negative frequencies and that phase mismatch is odd symmetric to the zero frequency).

Figure 4C:
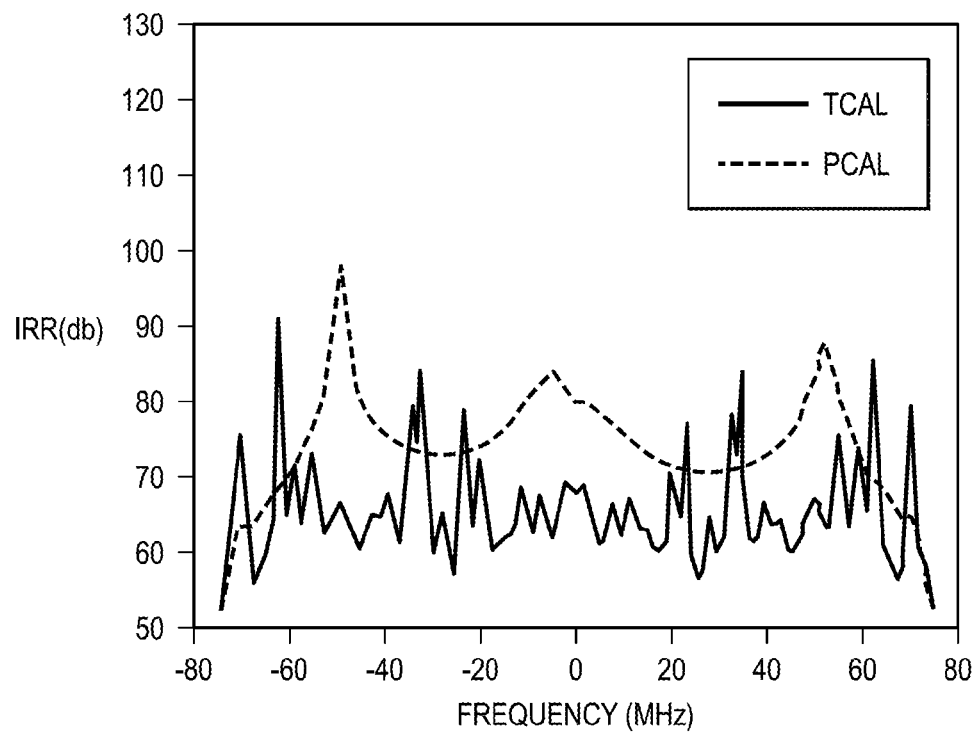
FIG. 4C illustrates an example graphical plot of the performance of an embodiment of the disclosure at a third noise level.
Figure 4D:
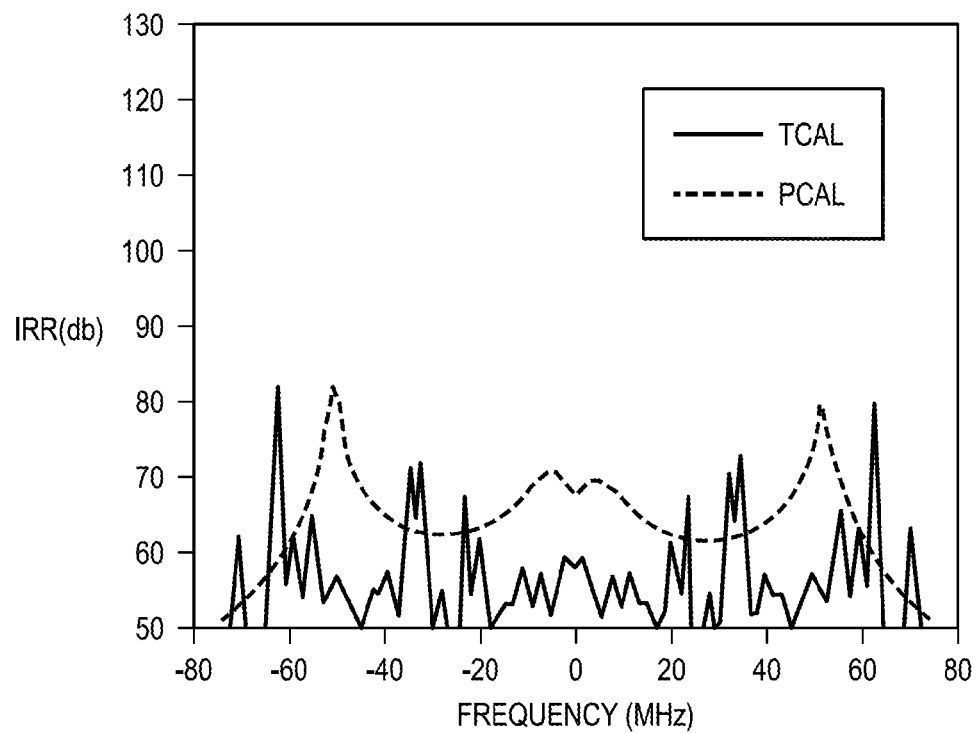
FIG. 4D illustrates an example graphical plot of the performance of an embodiment of the disclosure at a fourth noise level.

FIG. 4A illustrates improvement at no noise, FIG. 4B illustrates improvement at 51 dB, FIG. 4C illustrates improvement at 41 dB and FIG. 4D illustrates improvement at 31 dB. It can be seen that, as noise is progressively worse from having no noise at FIG. 4A, to FIG. 4B, at 51 dB, FIG. 4C, at 41 dB, and FIG. 4D, at 31 dB, the PCAL plot is much smoother across the frequency spectrum, as compared to not using the polynomial method. The simulations illustrate that at low noise, performance is similar. As noise increases, the better performance of PCAL calibration becomes significant. In certain embodiments, as the noise increases, PCAL using the polynomial method outperforms TCAL estimation not using the polynomial method by at least 10 dB. Because of the significant reduction of unknown parameters for estimation, the method shows a strong robustness to noise.

In the discussions of the embodiments above, the capacitors, buffers, interconnect boards, clocks, tone generators, processors, TCALs, PCALs, receivers, LNAs, mixers, digital processor blocks, QECs, LOs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

While this disclosure has described at least one illustrative embodiment, various alterations, modifications, and improvements are possible. Such alterations, modifications, and improvements are within the spirit and scope of the disclosure. Accordingly, the foregoing disclosure is by way of example only and is not intended as limiting. Any number of the functional blocks of the example embodiments may be implemented on a board of an associated electronic device.

The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the described functions may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the described functions and processes have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and functional arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more functional elements. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of elements. It should be appreciated that the FIGURES and its teachings are readily scalable and can accommodate a large number of components, as well as more complicated/sophisticated arrangements and configurations. Accordingly, the examples provided should not limit the scope or inhibit the broad teachings of the disclosure as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for calibrating an I/O. receiver, comprising:
receiving, from a tone calibration estimator, a first set of mismatch parameters indicating a mismatch between I and Q channels of the I/O. receiver, wherein the first set of mismatch parameters includes a total gain mismatch parameter and a total phase mismatch parameter, and wherein the tone calibration estimator is to inject test tones at frequencies within a test spectrum into the I/O. receiver; and
estimating, by a polynomial calibration estimator, a second set of mismatch parameters from the first set of mismatch parameters using a polynomial model, wherein the second set of mismatch parameters includes a frequency-dependent gain mismatch parameter, a frequency-dependent phase mismatch parameter, and a frequency-independent phase mismatch parameter.

2. The method of claim 1, wherein estimating the second set of mismatch parameters comprises applying a third or fourth order polynomial to estimate the second set of mismatch parameters.

3. The method of claim 1, wherein the first set of mismatch parameters comprises a first plurality of frequency dependent mismatch parameters at frequencies over a test spectrum, and wherein estimating the second set of mismatch parameters comprises estimating a second plurality of frequency dependent mismatch parameters over negative and positive frequency pairs in the test spectrum.

4. The method of claim 1, wherein estimating the second set of mismatch parameters comprises minimizing a matrix using least squared error (LSE) calculations.

5. The method of claim 1, further comprising:
generating, by the tone calibration estimator, N tone signals over a test spectrum;
providing, by the tone calibration estimator, the tone signals to the I/Q receiver;
performing, by the tone calibration estimator, tone calibration to generate the first set of mismatch parameters; and
providing the first set of mismatch parameters to the polynomial calibration estimator.

6. The method of claim 5, wherein estimating the second set of mismatch parameters comprises estimating a parameter mismatch over negative and positive frequency pairs in the test spectrum.

7. An apparatus for calibrating an I/O. receiver, the apparatus comprising:
a polynomial estimator to:
receive a first mismatch parameters, from a tone calibration estimator, wherein the first mismatch parameter indicates a mismatch between I and Q channels of the I/Q. receiver, and
estimate a second mismatch parameter from the first mismatch parameter estimation using a polynomial model;
a tone generator to generate N tone signals over a test frequency spectrum and input the tone signals into analog paths of the I/O. receiver;
a transform block, coupled to an end of a particular analog path, to transform a signal received at the end of the particular analog path from a time domain signal to a frequency domain signal and to output the frequency domain signal; and
the tone calibration estimator, coupled to the transform block and the polynomial estimator, to receive the frequency domain signal from the transform block, perform tone calibration on the frequency domain signal to generate the first mismatch parameter, and provide the first mismatch parameter to the polynomial estimator.

8. The apparatus of claim 7, wherein the polynomial estimator is to estimate the second mismatch parameter from the first mismatch parameter by applying a third or fourth order polynomial.

9. The apparatus of claim 8, wherein the polynomial estimator is to estimate the second mismatch parameter from the first mismatch parameter by applying a fourth order polynomial.

10. The apparatus of claim 7, wherein the first mismatch parameter comprises a first plurality of frequency dependent mismatch parameters at frequencies of a test spectrum, and wherein the polynomial estimator is to estimate the second plurality of frequency dependent mismatch parameters over negative and positive frequency pairs of the test spectrum.

11. The apparatus of claim 7, wherein the polynomial estimator is to estimate the second mismatch parameter using a polynomial with a matrix and uses least squared error (LSE) calculations.

12. The apparatus of claim 7, wherein the first mismatch parameter received by the polynomial estimator comprises a total gain mismatch and a total phase mismatch.

13. The apparatus of claim 7, wherein the second mismatch parameter comprises a total gain mismatch parameter and a total phase mismatch parameter for each frequency of the N tone signals.

14. An apparatus for calibrating an I/O. receiver, comprising:
a tone calibration estimator to inject test tones at frequencies within a test spectrum into the I/O. receiver, estimate a first set of mismatch parameters comprising a total gain mismatch parameter and a total phase mismatch parameter, and output the first set of mismatch parameters; and
a polynomial calibration estimator coupled to the tone calibration estimator, the polynomial calibration estimator to receive the first set of mismatch parameters from the tone calibration estimator and estimate a second set of mismatch parameters from the first set of mismatch parameters using a polynomial model, the second set of mismatch parameters comprising a frequency-dependent gain mismatch parameter, a frequency-dependent phase mismatch parameter, and a frequency-independent phase mismatch parameter.

15. The apparatus of claim 14, wherein the polynomial calibration estimator is to estimate the second set of mismatch parameters over negative and positive frequency pairs in the test spectrum.

16. One or more non-transitory computer readable media having instructions thereon that, in response to execution by one or more processing devices of an apparatus, cause the apparatus to provide a polynomial calibration estimator to:
receive, from a tone calibration estimator, a first set of mismatch parameters indicating a mismatch between I and Q channels of the I/O. receiver, wherein the first set of mismatch parameters includes a total gain mismatch parameter and a total phase mismatch parameter, and wherein the tone calibration estimator is to inject test tones at frequencies within a test spectrum into the I/O. receiver; and
estimate a second set of mismatch parameters from the first set of mismatch parameters using a polynomial model, wherein the second set of mismatch parameters includes a frequency-dependent gain mismatch parameter, a frequency-dependent phase mismatch parameter, and a frequency-independent phase mismatch parameter.

17. The one or more non-transitory computer readable media of claim 16, wherein the first set of mismatch parameters comprises a first plurality of frequency dependent mismatch parameters at frequencies over a test spectrum, and wherein estimation of the second set of mismatch parameters comprises estimation of a second plurality of frequency dependent mismatch parameters over negative and positive frequency pairs in the test spectrum.

18. The one or more non-transitory computer readable media of claim 16, wherein generate the second set of mismatch parameters comprises generate the second set of mismatch parameters jointly over multiple frequency pairs from the first set of mismatch parameters using the polynomial model.

19. The one or more non-transitory computer readable media of claim 16, wherein the instructions are further to, upon execution by the one or more processing devices of the apparatus, cause the apparatus to provide the tone calibration estimator to:
generate N tone signals over a test spectrum;
provide the tone signals to the I/Q receiver;
perform tone calibration in the tone calibration estimator to generate the first set of mismatch parameters; and
provide the first set of mismatch parameters to the polynomial calibration estimator.

20. The one or more non-transitory computer readable media of claim 16, wherein the instructions are further to, upon execution by the one or more processing devices of the apparatus, cause the apparatus to:
correct for mismatch represented by the second set of mismatch parameters in the I/O receiver.

* * * * *